(12) United States Patent
Lowe

(10) Patent No.: US 10,508,379 B2
(45) Date of Patent: Dec. 17, 2019

(54) HIGH TEMPERATURE DRYER DOOR SEALS AND RELATED METHODS

(71) Applicant: Felters of South Carolina, LLC, Roebuck, SC (US)

(72) Inventor: Vernon J. Lowe, Greenback, TN (US)

(73) Assignee: Felters of South Carolina, LLC, Roebuck, SC (US)

( * ) Notice: Subject to any disclaimer, the term of this patent is extended or adjusted under 35 U.S.C. 154(b) by 0 days.

(21) Appl. No.: 15/918,911

(22) Filed: Mar. 12, 2018

(65) Prior Publication Data

US 2018/0274159 A1 Sep. 27, 2018

Related U.S. Application Data

(60) Provisional application No. 62/470,179, filed on Mar. 10, 2017.

(51) Int. Cl.
| | |
|---|---|
| *F26B 25/00* | (2006.01) |
| *D06F 37/26* | (2006.01) |
| *F26B 9/06* | (2006.01) |
| *D06F 39/14* | (2006.01) |
| *D06F 58/04* | (2006.01) |
| *F26B 25/12* | (2006.01) |
| *G06T 11/00* | (2006.01) |
| *A63F 13/213* | (2014.01) |

(Continued)

(52) U.S. Cl.
CPC .......... *D06F 37/263* (2013.01); *A63F 13/213* (2014.09); *A63F 13/655* (2014.09); *A63F 13/92* (2014.09); *D06F 39/14* (2013.01); *D06F 58/04* (2013.01); *F26B 9/06* (2013.01); *F26B 25/12* (2013.01); *G06F 3/011* (2013.01); *G06F 3/04815* (2013.01); *G06F 3/04845* (2013.01); *G06K 9/00355* (2013.01); *G06K 9/00671* (2013.01); *G06T 11/00* (2013.01)

(58) Field of Classification Search
CPC ........ D06F 37/263; D06F 58/06; D06F 39/14; F26B 25/12; F26B 9/06
USPC .......... 34/242, 601, 315, 921, 944; 277/359, 277/304, 307, 351, 352, 353, 358, 360, 277/362, 363, 364, 645; 49/475.1, 490.1, 49/498.1
See application file for complete search history.

(56) References Cited

U.S. PATENT DOCUMENTS 2,459,720 A 1/1949 Poltorak
2,895,759 A * 7/1959 Conrad .................. F16J 15/104
277/632

(Continued)

*Primary Examiner* — John P McCormack
(74) *Attorney, Agent, or Firm* — J. Bennett Mullinax, LLC

(57) ABSTRACT

High temperature dryer door seals and related methods are disclosed herein. Such a dryer door seal can include an outer substrate forming an interior cavity. The outer substrate is deformable upon compression and can have a shape to provide a tight seal between a dryer door and a bulkhead of the dryer. The dryer door seal can also include an inner substrate residing the interior cavity of the outer substrate that permits the outer substrate to deform upon compression between a dryer door and a bulkhead of the dryer. The dryer door seal can further include a heat resistant coating disposed on at least one surface of the inner substrate that expands at temperatures above an activation temperature. The outer substrate can include a polymer that has a melting point below the activation temperature at which the heat resistant coating is activated.

20 Claims, 11 Drawing Sheets

(51) Int. Cl.
*G06F 3/01* (2006.01)
*G06F 3/0481* (2013.01)
*G06F 3/0484* (2013.01)
*A63F 13/655* (2014.01)
*A63F 13/92* (2014.01)
*G06K 9/00* (2006.01)

(56) References Cited

U.S. PATENT DOCUMENTS

| | | | |
|---|---|---|---|
| 4,156,533 A * | 5/1979 | Close | F01N 3/2857 |
| | | | 277/652 |
| 4,214,571 A | 7/1980 | Scherer | |
| 4,381,612 A * | 5/1983 | Shank | D21F 1/0072 |
| | | | 139/383 A |
| 5,383,316 A | 1/1995 | Burke et al. | |
| 5,407,214 A | 4/1995 | Lew et al. | |
| 5,628,520 A | 5/1997 | Ueda et al. | |
| 5,765,838 A | 6/1998 | Ueda et al. | |
| 8,510,996 B2 * | 8/2013 | Foster | E06B 5/164 |
| | | | 49/489.1 |
| 9,562,610 B2 | 2/2017 | Lowe et al. | |
| 9,970,705 B2 | 5/2018 | Lowe | |
| 10,113,646 B2 | 10/2018 | Lowe et al. | |
| 2005/0017459 A1 | 1/2005 | Cross et al. | |
| 2006/0111003 A1 | 5/2006 | Balthes | |
| 2006/0178064 A1 | 8/2006 | Balthes | |
| 2007/0044342 A1 | 3/2007 | Burns et al. | |
| 2007/0074419 A1 | 4/2007 | Starrett | |
| 2007/0116991 A1 | 5/2007 | Balthes | |
| 2007/0130790 A1 * | 6/2007 | Jung | D06F 58/04 |
| | | | 34/242 |
| 2007/0141318 A1 | 6/2007 | Balthes | |
| 2008/0090477 A1 | 4/2008 | Balthes | |
| 2014/0248814 A1 | 9/2014 | Handermann | |
| 2014/0327212 A1 * | 11/2014 | Lowe | F16J 15/16 |
| | | | 277/345 |
| 2015/0132564 A1 | 5/2015 | Arfsten et al. | |
| 2018/0128373 A1 | 5/2018 | Lowe | |
| 2018/0274160 A1 | 9/2018 | Lowe | |

* cited by examiner

HIGH TEMPERATURE DRYER DOOR SEALS AND RELATED METHODS

RELATED APPLICATION

The presently disclosed subject matter claims the benefit of U.S. Provisional Patent Application Ser. No. 62/470,149, filed Mar. 10, 2017, the disclosure of which is incorporated herein by reference in its entirety.

TECHNICAL FIELD

The present subject matter relates to dryer seals and related methods. In particular, the present subject matter relates to fire retardant dryer seals for use in and around doors and bulkheads of clothes dryer appliances that expand to restrict airflow at extremely high temperatures and methods related to such dryer seals.

BACKGROUND

Domestic clothes dryers are a common household appliance that, in conjunction with domestic washers, have reduced the burden of laundry of many households by reducing the amount of time devoted by household caregivers to washing and drying clothes. Such clothes dryers typically include a housing (also known as a bulkhead) and a rotating drum, cylinder, supported within the housing. Commercially available air vented domestic clothes dryers use the rotating drum to tumble loads of washed clothes in a heated environment by generally using a blower/fan to pull ambient air across heater coils to raise the temperature of air passing into the drum. The heated air is pulled through the tumbling clothes and out through a lint screen for discharge. Commercially available condensing domestic clothes dryers also use the rotating cylinder to tumble loads of laundry in a heat environment, but treat the air in a slightly different manner. These condensing domestic clothes dryers use a blower/fan to pull ambient air across heater coils into the drum, through the tumbling clothes and out through a lint screen, across a condenser coil to remove moisture, and then return to the drum.

The dryers have doors used to access the interior of the drum of the respective dryers and these door use door seals to provide a tight seal of the door around the bulkhead and the drum. These door seals help to maintain a constant pressure and temperature within the drum of the dryer during operation.

Despite their widespread use in U.S. homes, clothes dryers are involved in a significant number of residential fires. According to some estimates, dryer fires produce annual U.S. property losses approaching $100 million, and lead to multiple consumer deaths and hundreds of injuries. Proper installation and effective maintenance of clothes dryers can significantly reduce the risk of appliance-related fires. But recent research has shown that product construction and design considerations are also important elements in building safer dryers.

The causes of electric dryer fires have been extensively researched over the past decade by the U.S. Consumer Product Safety Commission (CPSC), industry associations including the Association of Home Appliance Manufacturers (AHAM), individual appliance manufacturers, and standards organizations including Underwriters Laboratories (UL). Some research has pointed to the accumulation of lint and the subsequent reduction of air flow as a primary cause of dryer fires. Yet, other testing has supported claims that the cause of dryer fires can be attributed to a number of factors. In particular, studies have found that factors such as a dryer load, a dryer's electrical system, and a dryer's mechanical system also played a major role in reported dryer fires.

While increased consumer education regarding risks with dryer use can help reduce the number of dryer fires, attention can be focused on the design of dryers themselves, and the ability of a dryer unit to actually contain a fire, should one occur. United States (U.S.) fire regulations have been defined by UL Appliance Containment # UL 2158, which requires that a fire in the appliance be contained within the appliance and not allowed to escape into the environment surrounding the appliance. For fires that initiate inside the drum, one potential point of egress is the mating area between the cylinder and the front door and/or rear bulkhead. Clothes dryer fires have a wide temperature range depending on the fuel value of the load plus any fuel value items in the unit construction such as plastic baffles, friction reducing rings, fittings or bulkhead components, etc. The temperatures have been tested to exceed 1300° F. and cycle between low and high values. These temperatures exceed the capability of sustaining structural integrity of traditionally used wool and polyester nonwoven materials, even FR treated polyesters.

Another serious and dangerous situation that arises when a fire starts or begins to smolder within the drum is the opportunity of a smoke explosion. A smoke explosion is a condition whereby the rapid increase in pressure inside the drum/combustion chamber during a dryer fire is sufficient to overcome the door lock mechanism. The lock specification has been tested and indicated a twelve (12) foot pounds locking force. Therefore, these smoke explosions provide a great release of force that can create opportunity for bodily injury to people in the vicinity of the dryer and can cause the fire to spread quickly from being contained in the dryer to areas surrounding the dryer and to other parts of the house. These smoke explosions occur when a fire is contained in the drum producing smoke and providing a spark. Tests have shown that, as fire burns, the mixture of carbon monoxide (CO) from the white smoke, which contains residual unburnt hydrocarbons, and oxygen ($O_2$) can occur within drum. The fire ignites this deadly mixture once it is achieved to explosive and horrific effect. Such a condition is known as pyrolysis.

To help control and reduce such combustion events within the drum of the dryer, efforts have mainly been concentrated on the containment features of the drum seals and wiring tracks from the control console and electrical components. Thereby, much of the research work in containing and reducing these combustion events has been focused upon these items.

The interior of the clothes dryer drum within a dryer is accessed through a door which is fitted with a deformable/crimp type seal. The dryer and its door are produced in either side hinge or drop down hinge styles. The door seal for the dryer door is normally configured in 2 (two) basic formats: a specialist circular knitted wire substrate with an aramid woven or knitted sleeve fitted over the substrate; or a PVC Extruded 'D'-section molding with additional fin structure to broaden the crimp envelope. The D-section molding is much cheaper to produce and is provided at a lower cost than the knitted wire substrate. While the knitted wire substrate provides better sealing and protection during a fire or combustion event, it has been found that neither door seal operates very well in containing and/or reducing such fire or combustion events.

As such, a need exists for improved dryer door seals that an help reduce the opportunity of combustion events and smoke explosions within dryers and that can help contain fires that initiate inside of a drum of a clothes dryer.

SUMMARY

The present subject matter provides seals for use in clothes dryers and related methods. In particular, dryer seals are provided that can facilitate containment of drum initiated fires and reduce opportunity for smoke explosions within the dryers in which they are used while still providing friction reduction and air sealing capabilities. Methods related to the manufacture and use of the dryer seals disclosed herein are also provided.

Thus, it is an object of the presently disclosed subject matter to provide dryer door seals that can reduce the opportunity of combustion events and smoke explosions within dryers and help contain fires that initiate inside of a drum of a clothes dryer as well as to provide methods related to such dryer door seals. While one or more objects of the presently disclosed subject matter having been stated hereinabove, and which is achieved in whole or in part, by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1:
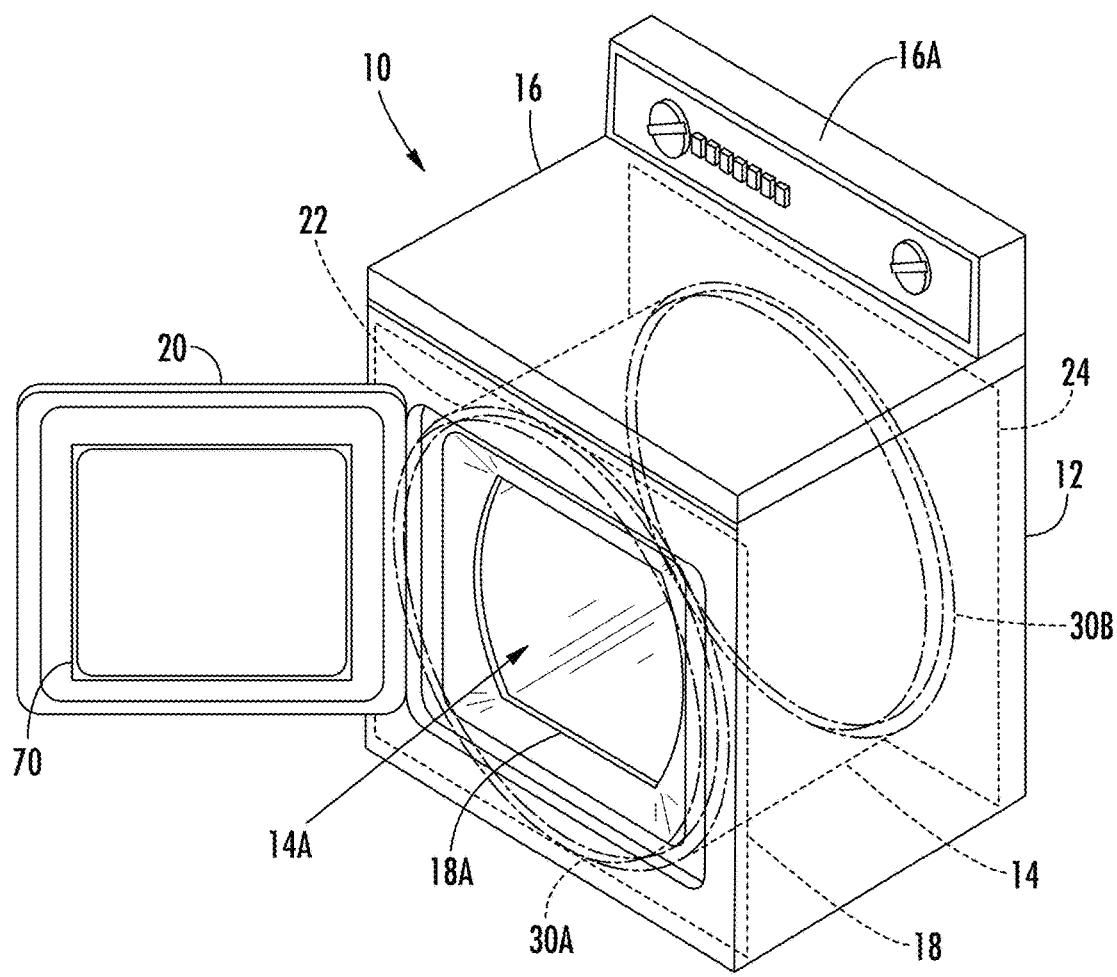
FIG. 1 illustrates a perspective view of an embodiment of a clothes dryer with a rotating drum that includes an embodiment of a door seal according to the present subject matter.

Repeat use of reference characters in the present specification and drawing is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter not as a limitation. In fact it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended limiting the broader aspects of the present subject matter, which broader aspects are embodied in exemplary constructions.

Although the terms first, second, right, left, front, back, etc. may be used herein to describe various features elements, components, regions, layers and/or sections, these features, elements, components, regions, layers and/or sections should not be limited by these terms. These terms are only used to distinguish one feature, element component, region, layer or section from another feature, element, component, region, layer or section. Thus, a first feature, element, component, region, layer or section discussed below could be termed a second feature, element, component, region layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top or" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

As used herein the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (e.g., 1 μm) are generally referred to as "microparticles", since the micrometer scale generally involves those materials having an average size of greater than 1 μm.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

As used herein, the term "polymer" generally includes, but is not limited to, homopolymers: copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes acrylic ester polymers and copolymers, polyvinyl chloride, polyvinyl acetate, etc. and copolymers thereof.

Dryer seals have been shown and described in detail in U.S. Provisional Patent Application Ser. No. 61/806,944 and U.S. patent application Ser. No. 14/242,855, which are incorporated herein in their entireties. Additionally, dryer seals have been shown and described in detail in U.S. Provisional Patent Application Ser. No. 62/044,405 and U.S. patent application Ser. No. 14/842,827, which are also incorporated herein in their entireties. The dryer seals described provide ample background and understanding of the operation of the dryer seal and description of the improvements to the dryer seals that are enhanced by the present description.

As disclosed herein, high temperature dryer seals for the doors and bulkheads of dryers are provided. A high temperature dryer door seal can comprise an outer substrate forming an interior cavity. The outer substrate can be deformable upon compression and can have a shape to provide a tight seal between a dryer door and a bulkhead of the dryer. The dryer door seal can also comprise an inner substrate residing within the interior cavity of the outer substrate and permitting the outer substrate to deform upon compression between a dryer door and a bulkhead of the dryer. Further dryer door seal can comprise a heat resistant coating disposed on at least one surface of the inner substrate that expands at temperatures above an activation temperature. The outer substrate of the dryer door seal can comprise a polymer that has a melting point below the activation temperature at which the heat resistant coating is activated.

The outer substrate can be a constructed in different manners and can comprise a variety of different materials. In some embodiments, the outer substrate can comprise an extruded polymer. For example, in some embodiments, the outer substrate can comprise an extruded polyvinyl chloride (PVC) with the interior cavity being formed during extrusion in some embodiments, the outer substrate can comprise a low-melt polymer. In some embodiments, the outer substrate can comprise a polymer with a melting point below about 400° F. In some embodiments, the outer substrate can comprise a polymer with a melting point about 320° F. or below. In some embodiments, the outer substrate can comprise a polymer with a melting point between about 270° F. and about 430° F.

Similarly, the inner substrate can be a constructed in different manners and can comprise a variety of different materials. For example, the inner substrate comprises a polymer with a melting point above the melting point of the outer substrate. For example, the inner substrate can comprise fibers, yarns, woven fabric, knitted fabric, or nonwoven fabric. In some embodiments, the inner substrate can comprise least one of extruded ribbon yarns, glass reinforced plastic (GRP) continuous filament fibers, PET and polypropylene point bonded nonwovens ropes braids, or corespun yarns. In some embodiments, the inner substrate can be an extruded core that is deformable, but has a melting point above the activation temperature of the heat resistant coating. In some embodiments, the outer substrate is extruded around the inner substrate. The inner substrate can retain its structure upon exposure to extreme heat or flame to hold the heat resistant coating in place and prevent it from being dissipated upon the melting and dispersion of the outer substrate.

In some embodiments, the amount of heat resistant coating on the inner substrate can generally correspond to the expected deformation door when exposed to extreme heat or flame. For example upon activation by exposure to heat, the heat resistant coating can create reduced air permeability and restricts fuel source flow around the door of the dryer. In some embodiments, the amount of heat resistant coating an be configured to compensate for the distortion of the door of dryer and melted outer substrate upon exposure to a combustion event. In some embodiments, the content and geometry of heat resistant coating can be configured to cover tolerance variations in door and front bulkhead and ensure an oxygen throttle for the combustion containment.

In some embodiments, a high temperature dryer door seal can comprise an outer substrate form in an interior cavity.

The outer substrate is deformable upon compression and can have a shape to provide a tight seal between a dryer door and a bulkhead of the dryer. The high temperature dryer door seal can comprise a heat resistant coating disposed within the interior cavity of the outer substrate that expands at temperatures above an activation temperature. The outer substrate can comprise a polymer that has a melting point below the activation temperature at which the heat resistant coating is activated. Similarly, in some embodiments, a high temperature dryer door seal can comprise an outer substrate comprising a body forming an interior cavity. The outer substrate is deformable upon compression and can have a shape to provide a tight seal between a dryer door and a bulkhead of the dryer. The high temperature dryer door seal can also comprise a heat resistant material that expands at temperatures above an activation temperature and can be dispersed within the body of the outer substrate. In such embodiments, the outer substrate can comprise a polymer that has a melting point below the activation temperature at which the heat resistant coating is activated.

In some embodiments, the heat resistant coating can be disposed on both a first surface and second surface of the inner substrate. In some embodiments, the inner substrate can be folded to form multiple layers of the heat resistant coating.

The heat resistant coating can comprise varies substances. For example, the inorganic material can comprise vermiculite, mica, clay materials, and/or calcium carbonate. The particles of the inorganic material can have a average thickness of less than about 50 nm, and wherein the particles have a larger dimension of about 0.5 µm to about 50 µm. The binder can comprise a film-forming binder comprising at least one intumescent substance.

During testing of drum seals, it became apparent that the two pressings that comprise the door contained residual stresses from the press tool process. When exposed to the burn containment condition and elevated temperatures these residual stresses were released and the door structure distorted. The distortion tends to be fairly uniform and tends to bow the door outward and release the pinch on the door seal. When this occurs, the condition permits the passage of oxygen into and flame out of the drum and could almost certainly create a burn containment fail condition. The door distortion can be significant. For example, the door distortion can be of the order of 0.185 inches-0.250 inches.

During the containment test, if the fire continues to propagate the internal temperature rises. For door seal embodiments that use the polyvinyl chloride (PVC) extrusion seal, once the drum internal temperature exceeds 320° F., the PVC door seal starts to melt, leak and flow out of the door seal area down the front of the appliance. When combined with the door stress deflection this seal failure can result in an air aperture in excess of 0.400 of an inch in the door seal area.

Alternatively, the aramid seal has high temperature safe operating temperature in excess of 1000° F. However, due to the door distortion cause by stress relief with exposure to excess temperatures, the aramid seal will likely fail to contain a combustion event and will likely fail a containment test. By using the heat resistant coating on an internal substrate coated, the heat activated heat resistant coating would replace the PVC material that melted away sealing nip and compensating for any door distortion to provide a restricted/semi air permeable seal that restricts and limits the source of fuel (oxygen) for the combustion event.

The insertion of the inner substrate with the heat resistant coating thereon into the interior cavity of the outer substrate during the extrusion process can require a specialist extrusion application. As stated above, various styles and substrate materials for the inner substrate can include, but are not limited to extruded ribbon yarns, GRP continuous filament fibers, PET and PP point bonds, ropes, braids and spun and corespun yarns. A primary consideration is the ability to accurately and consistently deposit relatively thin coatings of heat resistant material on the inner substrate. Alternatively, deposition of a liquid or spray based coating without use of an inner substrate may be possible if an even and full surface coating is possible inside the extrusion.

If an inner substrate used, the inner substrate can preferably have a low mass. Thereby, when placed inside the outer substrate, the inner substrate can have a minimal discernible influence upon the deformability of the flexible seal surface in normal application.

Figure 2:
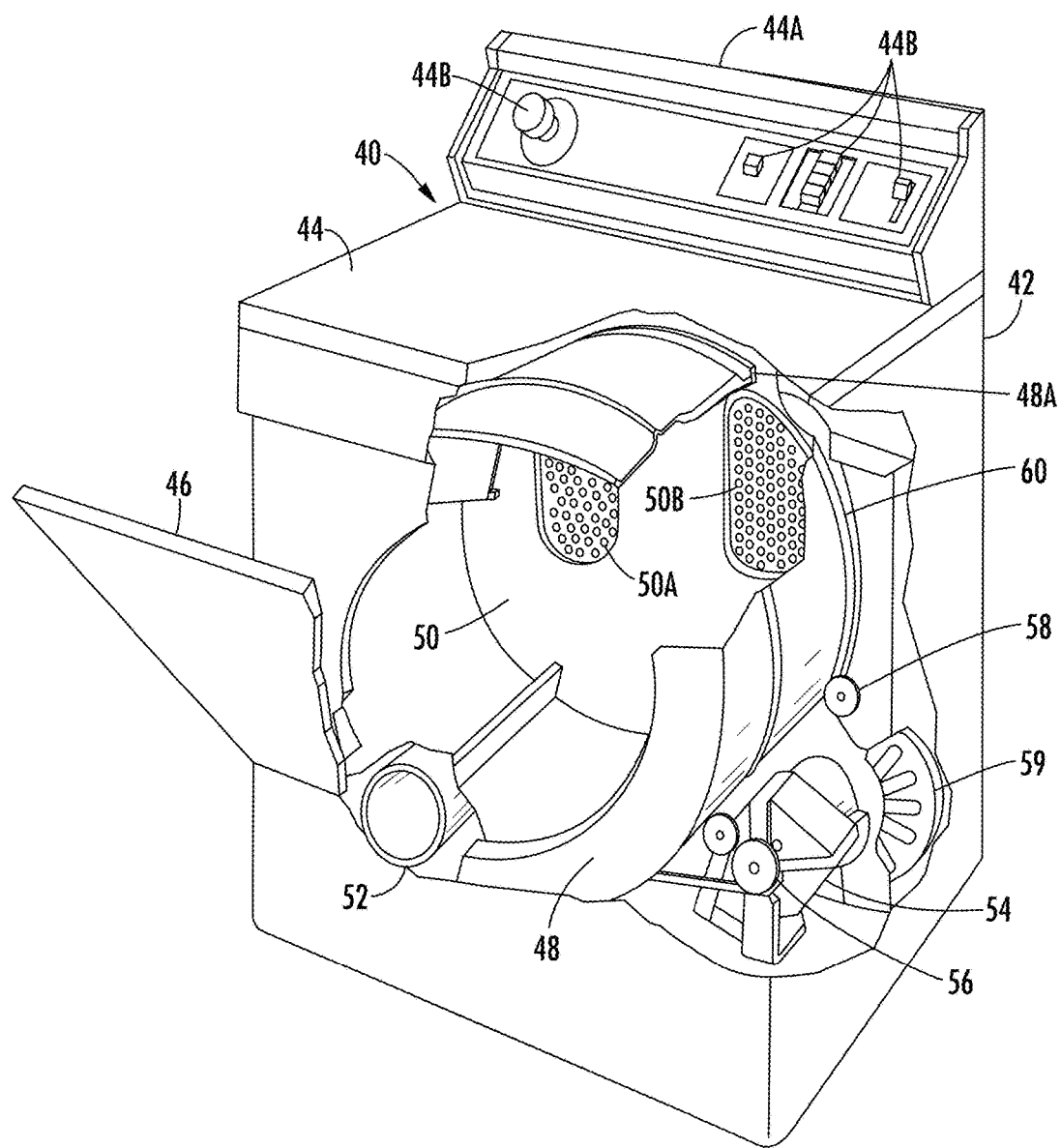
FIG. 2 illustrates a perspective view of another embodiment of a clothes dryer with a rotating drum that uses an embodiment of at door seal according to the present subject matter.

Referring now to FIGS. 1 and 2, example embodiments of a domestic clothes dryer are provided that illustrate the general placement and location of dryer seals according to the present disclosure in relation to other components of the respective dryers. In FIG. 1, an embodiment of a drawer 10 comprising a cabinet body 12 housing a heated rotating drum 14 is provided. As illustrated, cabinet body 12 can comprise a top panel 16 with a control console 16A. The cabinet body 12 can also comprise a front bulkhead 18 (shown in dotted lines) that can include a door opening 18A for loading clothing articles into a mouth 14A of the drum 14. The door opening 18A may be closed by means of a door 20. The front bulkhead 18 of the cabinet body 12 typically can include a front bulkhead flange 22 (shown schematically as the outer front circular dotted line) surrounding the door opening 18A and projecting into the interior of the cabin body. In such an embodiment, the front bulkhead flange 22 can be disposed generally around a reduced diameter drum opening. Similarly, cabinet body 12 can comprise a rear bulkhead 24 (shown in dotted line that can have a rear bulkhead flange (not shown in FIG. 1) projecting into the interior the cabinet body and can also be disposed generally around a reduced diameter drum opening. When the door 20 is closed, a door seal 70 can seal the dryer door 20 against the front bulkhead 18. The door seal 70 can comprise a structure that provides both a method to reduce or eliminate combustion events, including smoke explosions, within the dryer and fire retardant properties to and in containment if a fire was of ignite in the drum 14. Further, the door seal 70 can comprise a coating within at portion of the seal 70 that provides or enhance the respective seal's fire retardant and/or fire resistant properties. These properties are explained in more detail below.

As show in FIG. 1, a front seal 30A according to the disclosure herein (shown in dotted circular lines and generally interior to the bulkhead flange 22) can be disposed between the front bulkhead flange 22 of the front bulkhead 18 and a front a edge outer wall portion of the drum 14. Similarly, rear seal 30B according to the disclosure herein (shown in dotted circular lines) can be disposed between the rear bulkhead flange of the rear bulkhead 24 and a rear edge outer wall portion of the drum 14. Since dryers are typically vacuum systems, the seals 30A, 30B in operation can prevent or at least reduce the draw of cool (non-heated) air from around the drum 14. With this flow path blocked, air is drawn more efficiently into the drum 14 from a heated element area for use and eventual vent discharge. Additionally, the seals 30A, 30B can comprise a structure that includes contact surfaces that can provide reduced frictional engagement between the bulkheads 18, 24 and the drum 14. Further, one or both of the seals 30A, 30B can comprise a structure that provides both a method to reduce or eliminate smoke explosions within the dryer and fire retardant properties to aid in containment if a fire was to ignite in the drum 14.

Referring to FIG. 2, a partial cross-sectional view of a different embodiment of a clothes dryer 40 is provided that better illustrates an example interior of a clothes dryer. FIG. 2 refers to one type of air flow configuration, an in and out in the rear bulkhead. This is not meant to exclude other air flow paths such as an axial flow where air is either forced or vacuum fed across the heater coils or gas burner, and travels axially to the front panel/bulkhead and exits the drum through the screen and fan. It should be understood that the dryer seal technologies disclosed herein can be used in a variety of different dryer configurations.

Dryer 40 can comprise a cabinet body 42 with a top panel 44 having a control console 44A along a rear portion thereof incorporating a plurality of controls 44B for selecting an automatic series of drying steps. The cabinet body 42 can have a front door 46 providing access to the interior of a horizontally rotatable drying drum 48. The cabinet body 42 can also nave a non-rotating rear bulkhead 50 with air inlets 50A and air outlets 50B therein for charging the interior of the drum 48 with heated air from a heater 52 and for exhausting moisture laden air. It this embodiment of a dryer, an electric motor 54 can be provided to rotate the drum 50 through a pulley arrangement 56 on a plurality of rollers 58. The motor 54 can also drive a fan 59 which provides the air flow through the interior of the drum 48. The rotating drum 48 and the stationary rear bulkhead 50 can have a rear seal 60 extending therebetween. The rear seal 60 can be affixed to a rim 48A of the rotatable drum 48 and can be in frictional engagement with the rotating drum 48 and the stationary rear bulkhead 50. Cabinet body 42 an also comprise a stationary front bulkhead (not shown) with a front seal (not shown) disposed between the front bulkhead and a front rim of the drum 48. As above, the door 46 can comprise a door seal (not shown) that can seal dryer door 46 against a front bulkhead. As above the door seal can comprise a structure that provides both a method to reduce or eliminate combustion including smoke explosions, within the dryer and fire retardant properties to aid containment if a fire was to ignite in the drum 14. Further, the door seal can also comprise a coating within at least a portion of the seal that provides or enhances the respective seal's fire retardant and/or fire resistant properties.

In operation, the rear seal 60 and the front seal (not shown) used in dryer 40 can prevent or at least reduce the draw of ambient air from around the drum 48. Instead, air is drawn more efficiently through heater 52 and into the drum 48 through air inlets 50A before being eventually discharged through outlets 50B. As above, the rear seal 60 and the front seal can comprise a structure that includes contact surfaces that can provide a reduced frictional engagement between the rear bulkhead 50 and the drum 48 and between the front bulkhead and the drum 48. Further, the rear seal 60 and the front seal can also comprise a structure that provides both a method to reduce or eliminate smoke explosions within the dryer and fire retardant properties to aid in containment if a fire was to ignite in the drum 48.

Figure 3:
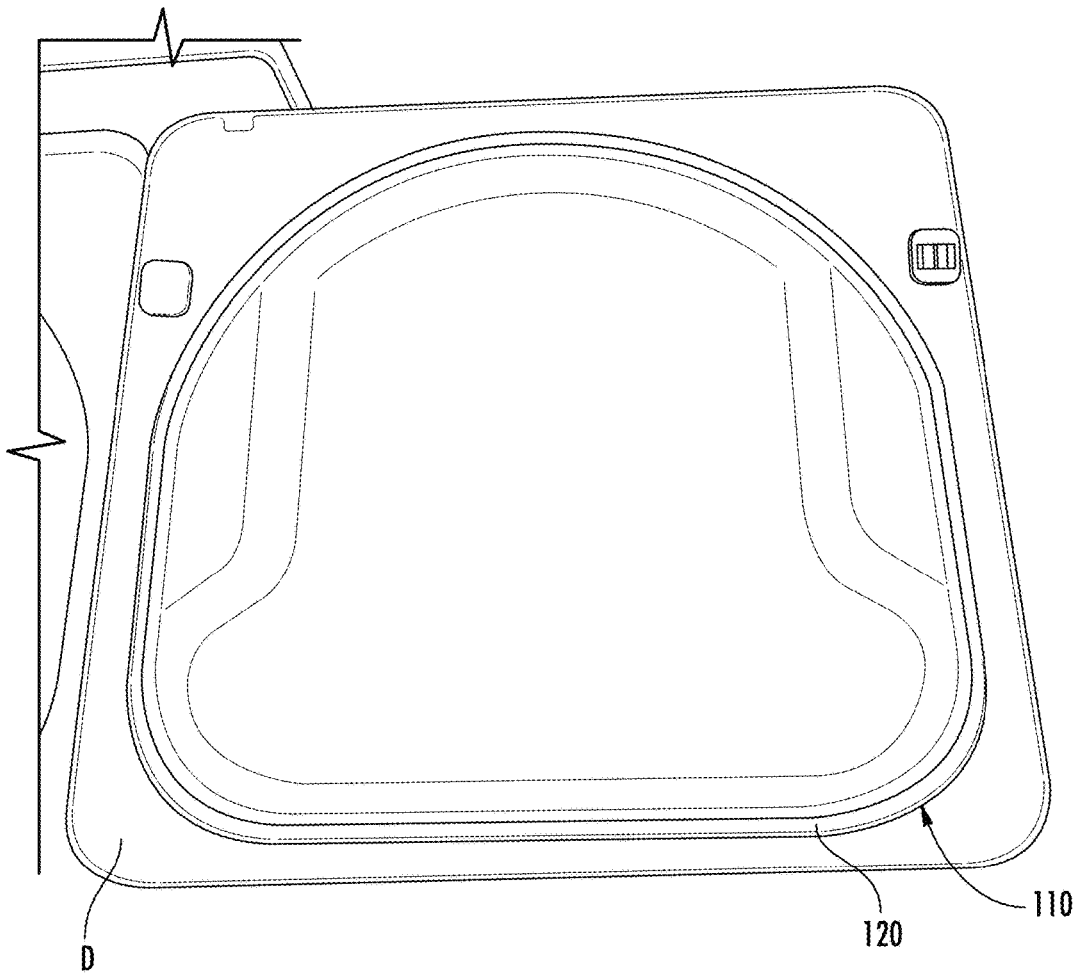
FIG. 3 illustrates a perspective view of an embodiment of a clothes dryer door that uses an embodiment of a door seal according to the present subject matter.
Figure 4:
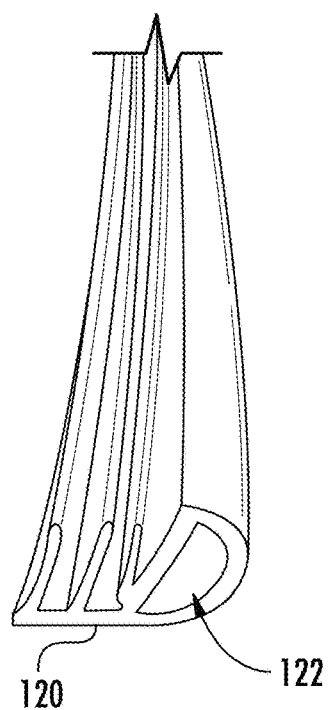
FIG. 4 illustrates a perspective cross-sectional view of an embodiment of an outer casing of a dryer door seal before insertion of an embodiment of a substrate with a high temperature, fire retardant coating according to the present subject matter.
Figure 5:
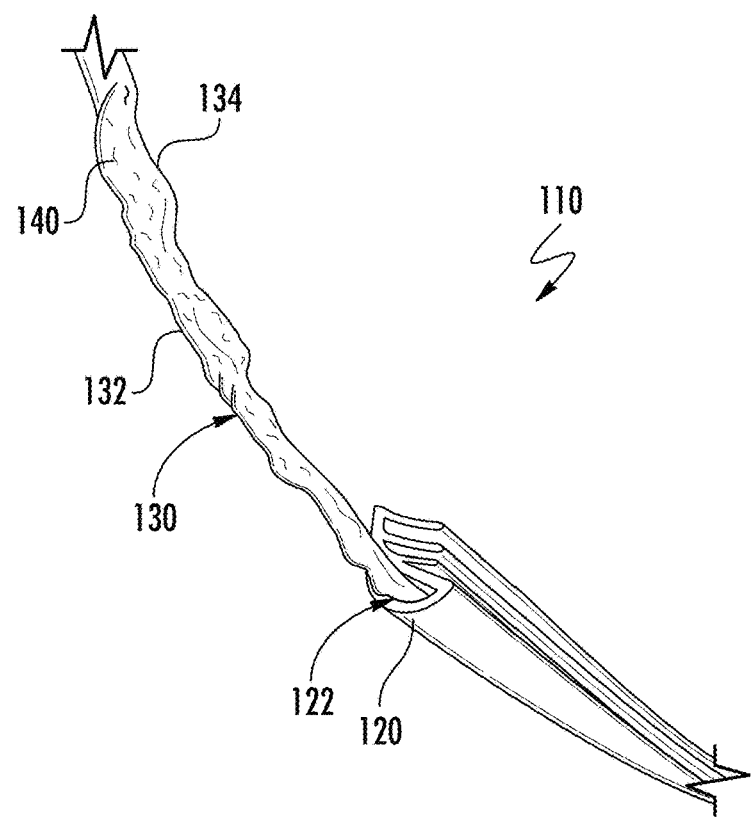
FIG. 5 illustrates a perspective cross-sectional view of the embodiment of the outer casing of a dryer door seal according to FIG. 4 during insertion of an embodiment of a substrate with a high temperature, fire retardant coating according to the present subject matter.

Referring to FIGS. 3, 4 and 5, a high temperature dryer door seal, generally 110, can be provided. As shown in FIG. 3, the dryer door seal 110 can be secured within a dryer door D in a manner that permits the door D to be sealed against a bulkhead (not shown) of a dryer when the door is in a closed position. Referring again to FIGS. 3, 4, and 5, the dryer door seal 110 can comprise an outer substrate 120 forming an interior cavity 122. In the present embodiment as shown in FIGS. 4 and 5, the interior cavity comprises a D-shaped section with the outer substrate 120 of a PVC extrusion. The cute substrate 120 can be deformable upon compression and can have a shape to provide tight seal between a dryer door D and a bulkhead of the dryer when the door D is closed.

As shown in FIG. 5, the dryer door seal 110 can also comprise an inner substrate 130 residing (upon insertion or placement) within the interior cavity 122 of the outer substrate 120. The inner substrate 130 is proportioned such that the inner substrate 130 can permit the outer substrate 120 to deform upon compression between a dryer door D and a bulkhead of the dryer. Further, dryer door seal 110 can comprise a heat resistant coating 140 disposed on at least one surface 132 of the inner substrate 130 that expands at temperatures above an activation temperature for the heat resistant coating 140. In the embodiment shown in FIG. 5, the heat resistant coating 140 is disposed on both surface 132 and surface 134 of the inner substrate 130. The outer substrate 120 of the dryer door seal 110 can comprise a polymer that has a melting point below the activation temperature of the heat resistant coating 140 at which the heat resistant coating 140 is activated.

Figure 6:
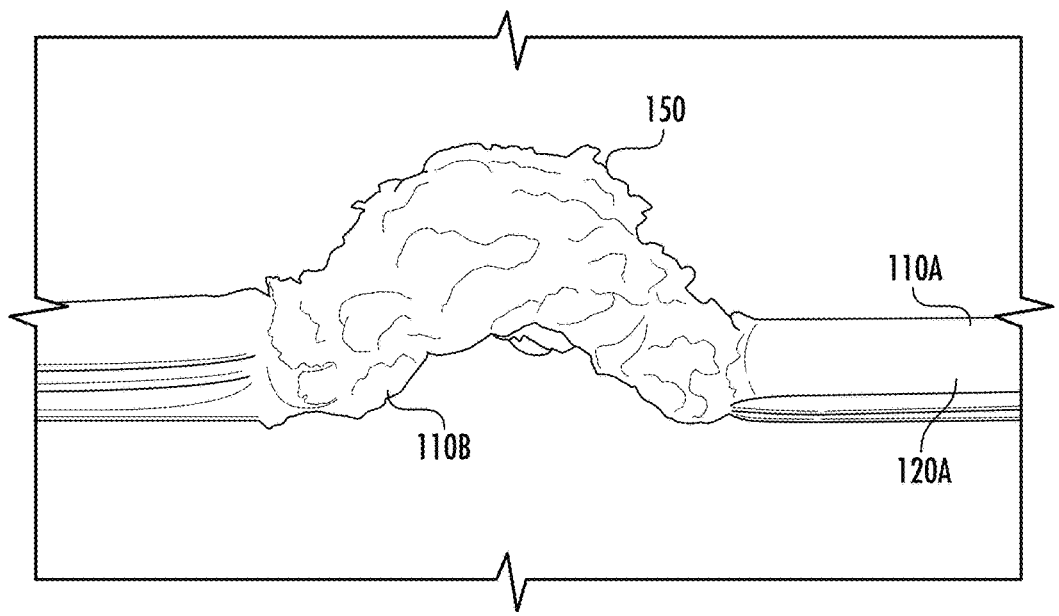
FIG. 6 illustrates a perspective view of a portion of an embodiment of a dryer door seal including the heat resistant or fire retardant coating according to the present subject matter after exposure to extreme heat and flame.
Figure 7:
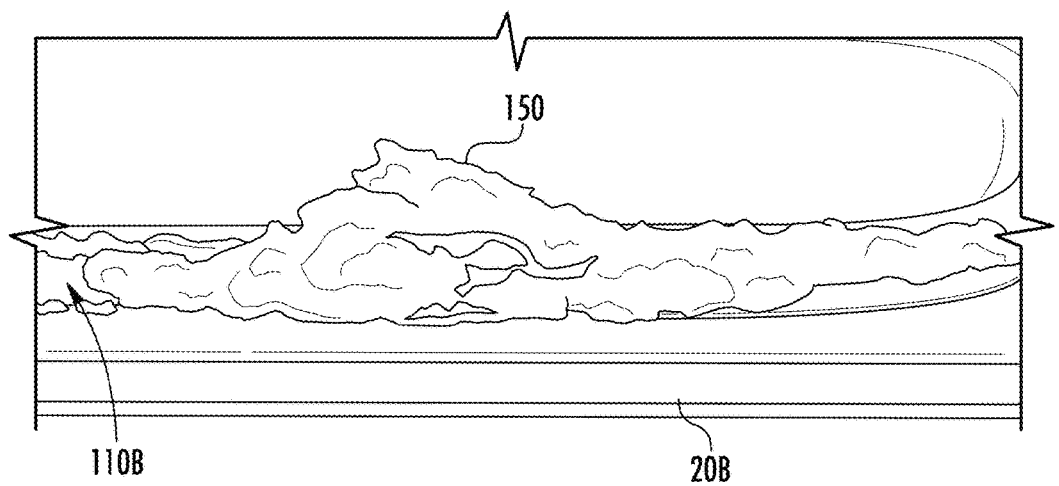
FIG. 7 illustrates a perspective view of a portion of another embodiment of a dryer door seal including the heat resistant or fire retardant coating according to the present subject matter after exposure to extreme heat and flame.

In example embodiments of dryer door seals as shown in FIGS. 6 and 7, the cross section surface area of the D-shaped section of a PVC extruded seal that was to serve as the outer substrate of a dryer door seal was calculated as approximately 20 cm$^2$. An inner substrate of a polyester (PET) pointbonded nonwoven having an area of about 20 cm$^2$, a weight/area of about 85 gram/square meter (GSM) and a height of approximately 0.009 inches (about 0.23 mm) was use. This inner substrate had about a 0.002 inches (about 0.05 mm) thick layer of heat resistant coating disposed on each side of the inner substrate. The inner substrate was then inserted into the interior cavity of the D-shaped section of the outer substrate. The door seals shown in FIGS. 6 and 7 were both exposed to an extreme heat and/or flame to illustrate what happens to the dryer door seal when it is exposed to such extreme heat and/or flame.

As shown in FIG. 6, door seal 110A with a PVC outer substrate 120A was provided with an interior cavity (not shown). The interior cavity of the outer substrate 120A was fitted with an inner substrate (not shown) of a boundary layer of PET pointbonded nonwoven with the heat resistant coating thereon as described above. The cross-section represented 20 mm and had approximately 0.002 inch thick layer of heat resistant coating on both sides. Upon exposing a portion or the door seal 110A to excessive heat, the PVC outer substrate 120A in the portion 110B of the door seal 110A exposed to the excessive heat is melted away and the heat resistant coating on the inner substrate is activated causing the coating to swell and expand to an activated door seal 150 that has an expanded volume. This activated seal can have a volume increase of about 140% from the volume of the door seal 110A with a PVC outer substrate 120A before exposure to extreme heat or flame it is noted that the sample was not constrained during combustion.

For example the excessive heat or extreme heat as referred herein can be a temperature within the drum where combustion occurs of about 600° F. or higher some embodiments. In some embodiments, the excessive heat or extreme heat as referred herein can be a temperature within the drum where combustion occurs of about 750° F. or higher. In some embodiments the excessive heat or extreme heat as referred herein can be a temperature within the drum were combustion occurs of about 900° F. or higher. For example, the excessive heat or extreme heat as referred herein is a heat within the drum that can heat the outer substrate of the door seal above its melting point and heat the heat resistant coating to a high enough temperature to is activation temperature for enough time to activate the coating.

FIG. 7 shows a portion of a door 20B from a dryer that has been exposed to an extreme heat within the drum of a dryer. In FIG. 7, a similar construction for the dryer door seal comprising the outer substrate, inner substrate, and heat resistant coating as described above was performed in which the door seal was placed in a dryer door 20B of a dryer (not shown) in which the dryer drum fire was created. When exposed to excess heat, this door seal also demonstrate significant growth. Upon exposing of door seal to excessive heat, the PVC outer substrate exposed to the excessive heat melts and adheres to the inner substrate which retains its structure in the charred door seal 110B with the heat resistant coating on the inner substrate being activated causing the coating to swell and expand to an activated door seal 150 that has n expanded volume.

Figure 8:
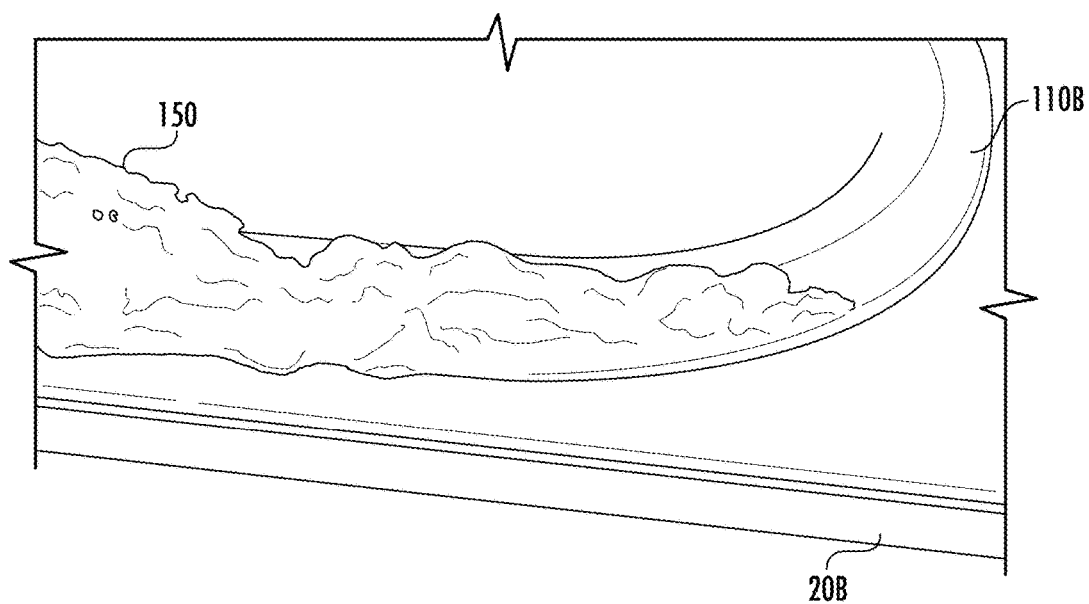
FIG. 8 illustrates a perspective view of a portion of an additional embodiment of a dryer door sear including the heat resistant or fire retardant coating according to the present subject matter after exposure to extreme heat and flame.

Referring to FIG. 8, a door seal that was placed within a door 20B and closed against a bulkhead of a dryer before and during testing is shown. The test simulated the intumescent inserted door seal in a sectioned dryer door located against a bulkhead. The inner seal, door and inner bulkhead was subject to 750° F. heat source. The outer substrate and the inner substrate are similar in construction to those described above with reference to FIGS. 6 and 7. Similarly, FIG. 8 illustrates the door 20B from a dryer that employed a dryer seal according to the present disclosure. The door 20B from the dryer has been exposed to an extreme heat in a dryer drum fire. As above, the dryer door seal, upon exposed to the excessive heat, has the outer substrate melted away to expose the inner substrate with heat resistant coating thereon to the excessive heat. The heat resistant coating on the inner substrate of the charred dryer seal 110B expands forming the activated door seal 150 that have an expanded volume to seal and/or reduce air flow through any gaps between the burned door 20B and the bulkhead of the dryer. The outer substrate of a PVC extrusion seal section with the D-shaped section melted and the heat resistant coating expanded and the 0.400" door/bulkhead feature with an approximate 20% excess. The picture in FIG. 8 also demonstrates the seal transition from PVC extrusion melting, turning to a liquid and adhering to portions of the inner substrate while the activated heat resistant coating grows and expands to fill the metal door seal carrier form and would fill all of or a substantial portion of any gap between the door and the bulkhead of the dryer.

In some embodiments the volume increase of an activated door seal 150 as compared to the door seal 110A before exposure to excessive heat flame can be between about 120% and about 250%. In some embodiments, the volume increase of an activated door seal 150 as compared to the door seal 110A before exposure to excessive heat or flame can be between about 120% and about 350%. For example, a dryer door seal having an inner substrate and outer substrate as described above can have a diameter of about 10 mm to seal the door during normal operations of a dryer. Upon exposure to excessive heat, the activated 150 can a diameter of between about 14 mm and about 25 mm when unrestricted by dryer structure. When the activated seal is within a dryer, the volume of the activated seal will conform to the volume available within the surrounding structure of the dryer.

The expected expansion of the heat resistant coating on the inner substrate with the inner substrate having a diameter of about 0.12 inches (about 3 mm) has enough layers of heat resistant coating to expand upon exposure to temperature above the activation temperature of the heat resistant coating to cause the inner substrate to expand to between about 0.500 inches (about 12.7 mm) to about 1 inch (about 5.4 mm). The samples in FIGS. 6, 7, and 8 were exposed to a heat source having a temperature of about 750° F. or above. In some embodiments, the unrestricted expanded heat resistant coating and inner substrate has been measured in excess of out 0.500 inches (about 13 mm). The expanded heat resistant coating and inner substrate has been measured in excess of about 0.700 inches (about 18 mm). The expanded heat resistant coating and inner substrate has been measured as about an inch (about 25 mm) or greater.

Figure 9:
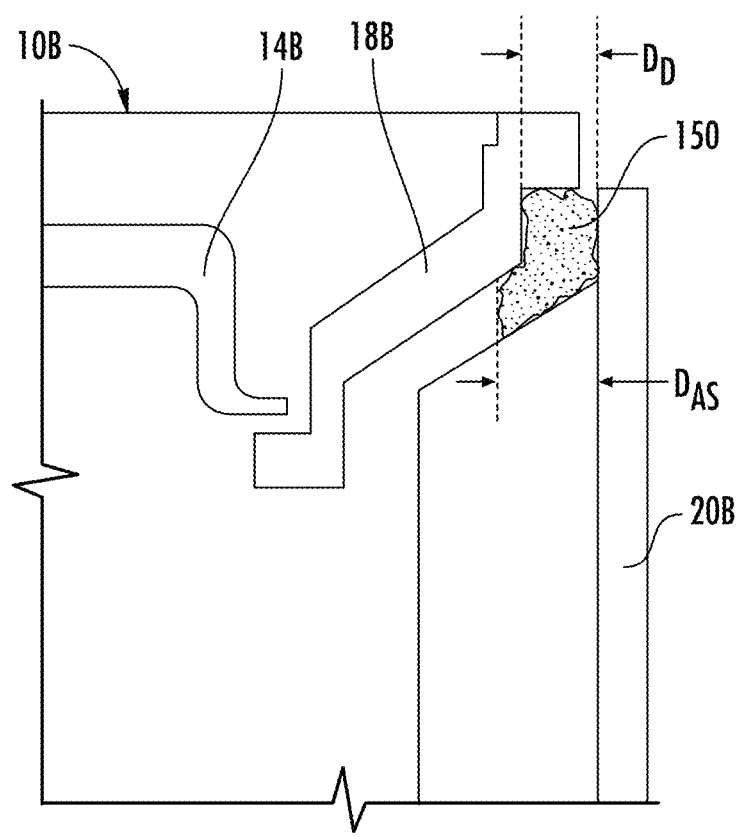
FIG. 9 illustrates a cross-sectional schematic side view of a portion of an embodiment of the dryer where a dryer drum fire/combustion event has occurred and a dryer door deformation has occurred with an activated heat resistant a dryer door seal according to the present subject matter after exposure to extreme heat and flame.

FIG. 9 illustrates a cross-sectional view of a portion of a dryer 10B in which a dryer drum fire has occurred within a drum 14B of the dryer 10B. Dryer 10B has a door 20B on which a dryer door seal as disclosed herein is secured. The heat caused by the fire can cause the door 20B to deform creating a larger gap between the deformed door 20B and a bulkhead 18B as compared to the gap between the door and the bulkhead under normal operations that is occupied by the dryer door seal before activation occurs. As shown, the heat from the dryer drum fire can cause the outer substrate to melt and the heat resistant coating on the inner substrate to expand to occupy the gap between the deformed door 20B and the bulkhead 18B. For example, the gap between the deformed door 20B and the bulkhead 18B can have a distance $D_D$. Upon exposure to the heat of the dryer drum combustion event, the activated seal 150 can expand to occupy the distance $D_D$ and can into other open areas to a distance $D_{AS}$ that can be larger than the distance $D_D$. For example, the deformation of a door can cause a further widening of the gap between the door 20B and the bulkhead 18B of between about 1 mm and about 10 mm. In some embodiments, the amount the gap is widened can be between about 2 mm and about 5 mm. For example, the amount the gap between the door 20B and the bulkhead 18B is widened can be between about 2 mm. The expansion of the activated seal 150 can occupy the full distance $D_D$ including the widen portion caused by deformation of the door 20B to restriction or prevent additional air passing around the dryer drum and into the dryer drum 14B to control and contain the combustion event within the dryer drum 14B.

The amount of heat resistant coating on the inner substrate generally corresponds to the expected deformation door when exposed to extreme heat or flame. For example, the amount of heat resistant coating can be applied in a manner that can be similar to or match the tolerances of the door within the dryer. Thereby, the amount of heat resistant coating can be configured to compensate for the distortion of the door of dryer and melted outer substrate upon exposure to a combustion event.

While a goal of activated door seal 150 that is expanded upon a combustion event in a dryer drum is for a seal between dryer door, which would likely be deformed, and the bulkhead of the dryer to be formed, this seal does not necessarily need to be airtight. For example, in some dryer embodiments, the activated seal 150 can be used to create a seal that allows a certain amount of air between the dryer drum and the environment surrounding the dryer through the door. For example, the expanded activated door seal 150 can have the effect of starving any fire or potential flame so that the combustible material within the drum only smolders and does not ignite into flame and/or stay ignited. Further, the fire can be prevented from propagating through the dryer door. Further, dangerous hydrocarbons that can increase the opportunity for an explosion can be allowed to escape the dryer drum.

While not being bound by any particular theory, it is contemplated that if a fire was to ignite in a drum, the heat resistant coating on the inner substrate of the dryer door seal could expand to effectively restrict the air flow into drum of the clothes dryer between the dryer door and the bulkhead. For example, in some embodiments, the air flow can be restricted to between about 15 cubic feet per minute (cfm) to about 30 cfm. In some embodiments, the air flow can be restricted to between about 20 cfm to about 30 cfm. The expanded activated door seal 150 can have aid in starving any fire or potential flame so that the combustible material within the drum only smolders and does not ignite into flame and/or stay ignited. Further, the fire can be prevented from propagating through the dryer door and its seal. The activated seal can act as an airflow throttle, thereby throttling the amount of oxygen that is expected to reach the drum. Thereby, the content and geometry of heat resistant coating can be configured to cover tolerance variations in door and front bulkhead and east an oxygen throttle for the combustion containment.

As stated above and explained in more detail below, the heat resistant coating can include an intumescent substance and/or a mineral based material. The mineral based material can include but is not limited to vermiculite mica, clay materials, calcium carbonate and the like or a mixture thereof. Vermiculite is generally known as a hydrated laminar magnesium-aluminum-iron silicate. Due to its crystalline structure, vermiculite expands with the application of heat. The expansion known as exfoliation is the result of the mechanical separation of layers of the vermiculite by the rapid conversion of the contained water into steam. The exfoliated material can then be combined with some form of chemical binder material which can in some instances include, but is not limited to a latex or silicon material. The binder can also comprise intumescent technology whereby the coating will swell and form a multi layered char form when exposed to heat. High carbon char is extremely heat resistant and is widely used in rocket and jet pipe technology. In some embodiments, the binders that comprise one or more intumescent substances can be used with or without a mineral based material. The mineral based material and/or the intumescent substances can, in some embodiments, include nanoparticles and/or microparticles.

Figure 10:
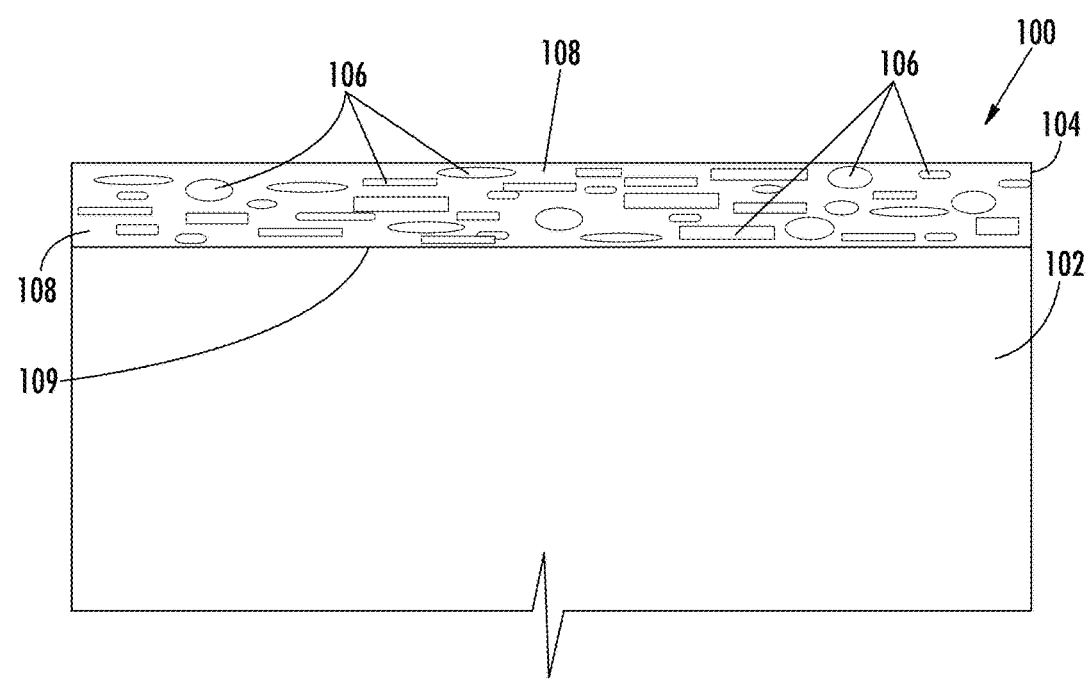
FIG. 10 illustrates a schematic cross-sectional view of a portion of an embodiment of an inner substrate of a dryer door seal that includes a heat resistant or fire retardant coating according to the present subject matter.

As shown in FIG. 10, an inner portion of a fire retardant dryer door seal, generally designated 100, schematically illustrates a heat resistant coating 104 on an inner substrate 102 of the dryer door seal 100. An inner substrate 102 can comprise one or more layers of textile material that can include, but is not limited to continuous filament fibers, yarns, nonwoven material, woven material, knitted material, film material or possible combinations thereof. In the embodiment shown, the heat resistant coating 104 can generally include particles 106 dispersed within a film-forming binder 108. In some embodiments (not shown), a heat resistant coating 104 can comprise an intumescent substance without the inclusion of particles 106.

In some embodiments, the particles 106 can comprise an inorganic mineral. The inorganic mineral particles 106 can generally serve, collectively, to deflect and/or absorb heat energy applied to the coating. If a more significant fire event occurs in the drum, then the heat resistant coating 104 is activated to insulate and cut off air flow to the fire within the drum from between the dryer rim and the bulkheads. In particular, the inorganic material can be a higher heat capacity that can absorb the heat from an intense fire in and around the drum. As stated above, the inorganic mineral material forming the articles 106 can include, but is not limited to, vermiculite, mica, clay materials, calcium carbonate and the like, or a mixture thereof.

In one particular embodiment, vermiculite can be included (either alone or in combination with another inorganic mineral material) in the heat resistant coating 104. Vermiculite is, as is generally known in the art a hydrated laminar magnesium-aluminum-iron silicate, which resembles mica in appearance, as both contain silicate sheets. Due to its crystal structure, vermiculite expands with the application of heat. The expansion, known as exfoliation, is the result of the mechanical separation of the layers within vermiculite by the rapid conversion of contained water to steam. Without wishing to be bound by any particular theory, it is believed that this expansion mechanism serves to absorb a large portion of the heat applied to the coating, resulting in the underlying fabric or the environment on the opposite side of the expanded coating from the fire or extreme heat being sufficiently protected from that heat. Thus, the resulting coating fabric is particularly suitable for enduring the quick exposure to heat, for example, from a flash fire within a dryer, to protect the underlying fabric or the environment on the opposite side of the expanded coating from the fire and its heat.

Prior to preparing the heat resistant coating, the inorganic mineral material (e.g., vermiculite) can be chemically exfoliated and/or granulated to form delaminated platelets. Any method of granulation can be used to obtain the desired size. As particles, the inorganic material can be dispersed within a suitable solvent system. The solvent system generally includes at least one solvent that is configured to disperse the inorganic particles in a substantially homogeneous manner (particularly upon mixing) so that a substantially uniform coating can be formed therefrom. In one embodiment, the solvent system can include water, an alcohol (e.g., methanol, ethanol, propanol, etc.), an organic solvent, or mixtures thereof.

In one particular embodiment, the inorganic particles 106 may, generally, have a plate-like shape in that each particle's thickness is less than the width and/or length. This particular shape of the particles 106 can be formed via granulation and/or exfoliation as discussed above. For instance, each particle 106 can have a thickness that is at least about 10 times less than the largest dimension of the particle. For example, the particles 106 can have an aspect ratio (width/length: thickness) of between about 500:1 to about 1000:1.

For example, the particles 106 may have an average thickness of less than about 50 nm, such as about 0.1 nm to about 50 nm when exfoliated. Alternatively, the particles 106 may have a larger dimension of about 0.5 µm to about 50 µm. For instance, the particles 106 may have a diameter or a greater dimension (in length or width) in the range of from about 10 µm to about 40 µm. As such, in certain embodiments, the particles 106 may have an average thickness of about 0.5 nm to about 10 nm, and may have a larger dimension of about 10 µm to about 40 µm (e.g., width and/or length). In one particular embodiment, the particles 106 can have an average size is of about 1 nm to about 2 nm in its thickness while having an average diameter or larger dimension in width or length of about 20 µm to about 40 µm.

Such a relatively small particle size can allow for a relatively large surface area of the mineral material for absorbing and/or dispersing heat applied thereto. Additionally, the use of such relatively small particles allows the coating to remain flexible.

The film-forming binder 108 generally serves to adhere and hold the particles 106 in place within the heat resistant coating 104 on the inner substrate 102. Thermal set or thermoplastic binders can be utilized to facilitate the coating process. Such binder materials include, but are not limited to, acrylic resins, styrene-butadiene rubber (SBR), polyvinyl alcohol, ethyl vinyl acetate resins, phenolic resins, etc., and combinations thereof. Additionally, other types of substances can be included in the binder 108.

In some embodiments, a binder 108 can adhere to a portion of the dryer door seal inner substrate 100 to provide heat resistance, fire retardancy, and/or fire resistance to the dryer door seal inner substrate 100 while the dryer seal inner substrate 100 still provides sealing capabilities. Regarding its fire resistance capabilities, the binder 108 can be formulated to include certain desired properties. Such properties, for example, can include, but are not limited to, having a low flame spread; having low smoke toxicity; providing thermal insulation protection; providing long term protection from heat and flame; having a low smoke production; easy application; good wear resistance; adherence to the desired base substrate; and the appropriate flexibility after application to permit the dryer seal to perform its in ended functions.

In some embodiments, binder 108 can comprise an intumescent coating which can fulfill many of these properties. An intumescent is a substance that swells as a result of heat exposure, thus increasing in volume and decreasing in density. The term intumescent when applied to fire protective coatings refers to a technology wherein the coating will swell and form a multi-layered char foam when exposed to heat. High carbon containing chars are extremely heat resistant and can be employed in critical high temperature applications such as the carbon on carbon composites that are machined to produce rocket exhaust nozzles. The production of these carbon on carbon composites involves the combination of graphite fibers with high char yield epoxies. After curing, these parts are graphitized in a high-pressure autoclave at high temperatures. Intumescent materials can be thermally stable to above 1,000° C. (1.832° F.). With the right choice of materials, intumescent coatings can produce a low thermally conductive char foam. Thus, a coating 104 that includes an intumescent substance can form a char foam that has a low thermal conductivity when exposure to fire and/or extreme heat.

Soft char intumescent substances can produce a light char that is a poor conductor of heat, thus retarding heat transfer. Typically, these intumescent substances can also contain a significant amount of hydrates. As the hydrates are spent, water vapor is released, which has a cooling effect. Once the water is spent, the insulation characteristics of the char that remains can slow down heat transfer from the exposed side to the unexposed side of the coating 104. Typically, the expansion pressure that is created for these products is very low, because the soft carbonaceous char has little substance, which is beneficial if the aim is to produce a layer of insulation. Harder char intumescent substances can be produced with sodium silicates and graphite. These intumescent substances can produce a more substantial char capable of exerting quantifiable expansion pressure. For example, in some embodiments, such intumescent substances can be used as at least a portion of the binder 108 and the inorganic particles can comprise a vermiculite material as discussed above.

While not being bound by any particular theory, it contemplated that if a fire was to ignite in a drum, the heat resistant coating 104 on the dryer seal inner substrate 100 could expand to effectively restrict the air flow into drum of the clothes dryer between the drum rim and the bulkheads. For example, in some embodiments, the air flow can be restricted to between about 15 cubic feet per minute (cfm) to about 30 cfm. This expansion can have the effect of starving any fire or potential flame so that the combustible material within the drum only smolders and does lot ignite into flame and/or stay ignited. Further, the fire can be prevented from propagating through the dryer seal. This effect combined with the insulative qualities of both such a binder 108 and inorganic particles 106 in heat resistant coating 104 can increase the effectiveness of the ability of the dryer seal to facilitate containment of dryer fires within the cabinet body.

In particular for some embodiments of the heat resistant coatings 104 in which the binders 108 comprise an embodiment of one or more intumescent substances, the chemistry of char formation can provide a classic dehydration reaction between hydroxyls, carboxylic acids and amines or amine groups to form polymeric linkages. The dehydration action requires heat and can be enhanced by an acid catalyst. Water and ammonia can be liberated during these reactions. Some such substances can contain oxygen or nitrogen on every carbon and nave natural propensity for char formation. Examples can include starches and sugars. Intumescent substances can comprise amino phosphates or amino sultanates that, upon heating, can liberate phosphoric or sulfonic acid to catalyze the dehydration reaction and ammonium ions to facilitate char formation in some embodiments, polymeric substances without an aliphatic carbon chain can be used as at least a portion binders 108 intumescent materials that have more nitrogen and oxygen, on the hydrocarbon chains can be more desirable.

Commercial examples of an intumescent substance that are available include INTUMAX manufactured by Broadview Technologies Inc. located it Newark, N.J. Such intumescent agents can allow the use of less intumescent agent in a binder's formulation which, in turn, can improve the physical and adhesive properties of the coatings. Many others sources of intumescent substances that can be added to binder materials are available.

To formulate intumescent coatings several additional chemistry considerations can be considered. For example, higher amounts of oxygen and nitrogen on carbon can make it easier to produce a char. In addition, the more double bonds the less heat will be released during the initial burning stage. Also, the temperatures at which dehydration and de-hydrogenation reactions occur vary for different polymers. The choice of an intumescent substance can affect the release of acid catalyst, oxygen addition catalyst and recombinant ammonium ions. In some embodiments, the intumescent substance used can release acid catalyst, oxygen addition catalyst and recombinant ammonium ions close in time to or simultaneously with the dehydrogenation and dehydration reactions.

Other considerations involve the melt flow rheology, the char height and char strength. There are also the conventional formulation considerations having to do with everything from thixotropic behavior to flexibility and everything in between. The formulation of the binder 108 that include one or more intumescent substances can be such that the formulation can help char properties not hurt them. For example, since char layers remain on the surface, wetting agents and defoamers that reduce surface tension may want to be avoided. Certain fillers can have synergistic benefits. The particles 106 can comprise ceramic and phenolic micro spheres that can add to the thermal insulative properties. Intumescent substances can be added to binder materials such as, but not limited to acrylic resins, styrene-butadiene rubber (SBR), polyvinyl alcohol, ethyl vinyl acetate resins, phenolic resins, etc., and combinations thereof.

These binder materials can be modified as desired to crosslink (e.g., with a crosslinking agent, such as melamine formaldehyde) or to change other characteristics such as hydrophobicity, hydrophilicity, viscosity, pH, etc. As such, other materials and components can be included within the heat resistant coating 104. For example, waxes, plasticizers, rheology modifiers, antioxidants, antistats, antiblocking agents, and other additives may be included as desired. Surfactants may be added to help disperse some of the ingredients, especially the film-forming binder within the solvent system. When present, a surfactant(s) can be included in the heat resistant coating. Exemplary surfactants can include nonionic surfactant and/or ionic surfactants.

A plasticizer may also be included in the heat resistant coating 104. A plasticizer is an additive that generally increases the flexibility of the final coating by lowering the glass transition temperature for the binder (and thus making it softer). In one embodiment, the plasticizer can be present in the heat resistant coating 104 up to about 25%, such as from about 5% to about 20%, by weight. Likewise, viscosity modifiers can be present in the heat resistant coating. Viscosity modifiers are useful to control the rheology of the coatings in their application. A particularly suitable viscosity modifier is high molecular weight polyethylene oxide. The viscosity modifier can be included in any mount to help the coating process, such as up to about 5% by weight, such as about 0.5% to about 3% by weight.

To form the fire retardant portion of the dryer door seal inner substrate 100, the particles 106 of inorganic material can be combined with the film-forming binder 108 to form a coating/paste, which can then be wet-laid onto a surface 109 of the inner substrate 102 and dried to form the coating 104. For example, the particles 106 can be combined as dry particles or dispersed within a solvent system, as discussed above. After drying, the inorganic material of the particles 106 can constitute about 0.5% by weight to about 99.5% by weight of the total weight of the heat resistant coating 104 (e.g., about 50% by weight to about 95% by weight).

Depending on the level of heat shielding desired and the space available within the interior cavity that still allows for proper deformation of the outer substrate to operate properly as a door seal, the thickness of the heat resistant coating 104 can be varied along with the type of inorganic material included in the particle 106 and/or the concentration of particles 106 in the coating 104. In most embodiments, the thickness of the heat resistant coating 104 can be about 10 µm to about 1 mm (e.g., about 10 µm to about 100 µm).

In some embodiments, a single application of the heat resistant coating 104 on the substrate 102 may be sufficient. However, multiple applications are available and can be applied using the method as described above. Thus, the presently described dryer door seal inner substrate 100 is not limited to a single layer of the heat resistant coating 104 on an inner substrate 102 of the dryer door seal inner substrate 100. The amount of heat resistant coating can be applied in a manner that can be similar to or match the tolerances of the door within the dryer. Thereby, the amount of heat resistant coating can be configured to compensate for the distortion of the door of dryer and melted outer substrate upon exposure to a combustion event.

As stated above, the inner substrate can comprise different structures including but not limited to continuous filament fibers, yarns, nonwoven material, woven material, knitted material, film material or possible combinations thereof.

Figure 11A:
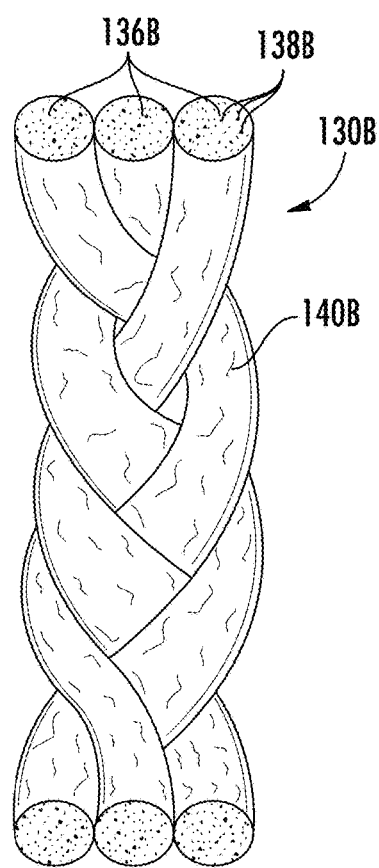
FIG. 11A illustrates a portion of an embodiment of an inner substrate used in an embodiment of a dryer seal according to the present subject matter.

FIG. 11A illustrates an example embodiment of an inner substrate 130B that comprises multifilament continuous yarns 136B that can have a heat resistant coating 140B thereon. The multifilament continuous yarns 136B can be twisted or braided together for insertion or may be aligned without twisting for insertion within an outer substrate. The heat resistant coating 140B can be applied to the multifilament yarns before or after they are twisted or braided together. As the embodiment shown in FIG. 11A, three multifilament yarns 136B can be braided. In other embodiments, the multifilament yarns can be twisted together. Each multifilament yarn 136B can comprise a plurality of continuous filaments 138B of a material that does not melt when exposed to the heat from a dryer fire. For example, the continuous filaments 138B can comprise at least one of glass fibers, aramid fibers, or silica fibers. The denier of the filament fibers 138B fiber can vary. Similarly, the denier of the multifilament yarns can vary as well as the number of yarns within the inner substrate. In some embodiments, the yarns used in the inner substrate can be a plurality of spun yarns of staple length fibers that do not melt when the yarns and fibers are exposed to the heat from a dryer fire.

Figure 11B:
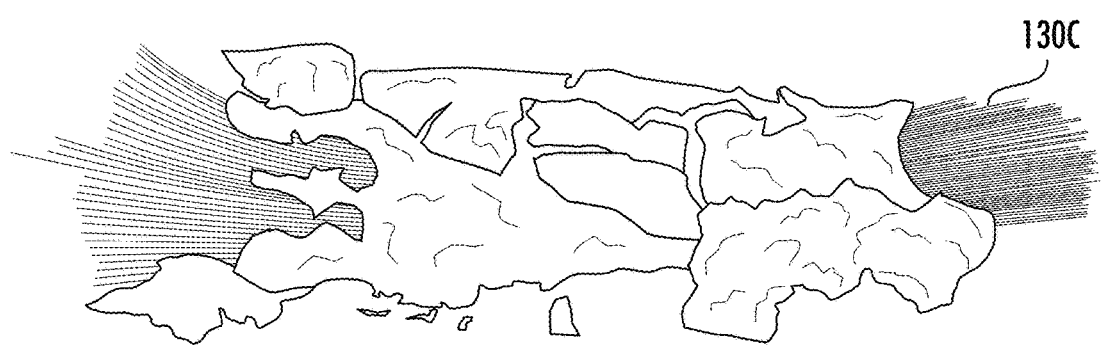
FIG. 11B illustrates a portion of an embodiment of an inner substrate used in an embodiment of a dryer seal after exposure to extreme heat and flame according to the present subject matter.

FIG. 11B illustrates an inner substrate 130C of three continuous multifilament yarns twisted together with a heat resistant coating thereon that has been exposed to excessive heat of 750° F. As can be seen, the fibers of three continuous multifilament yarns of the inner substrate 130C do not melt or degrade to a point that their structure fails. At the same time, the heat resistant coating on the inner substrate 130C expands to increase the volume of the inner substrate.

Figure 12A:
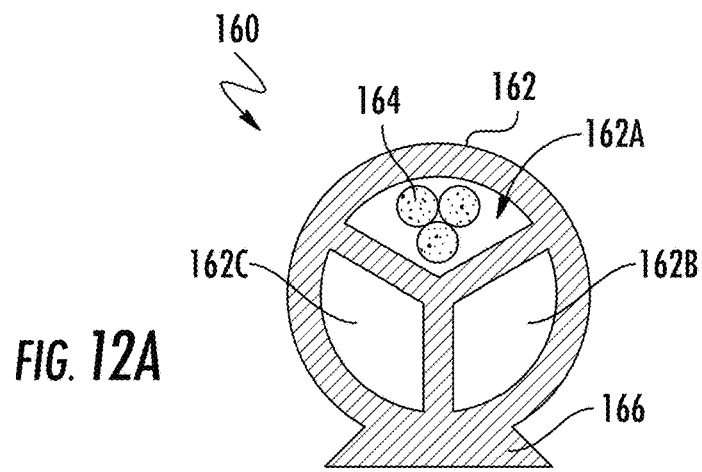
FIGS. 12A, 12B and 12C illustrate cross-sectional end views of additional embodiments of dryer seals according to the present subject matter.
Figure 12B:
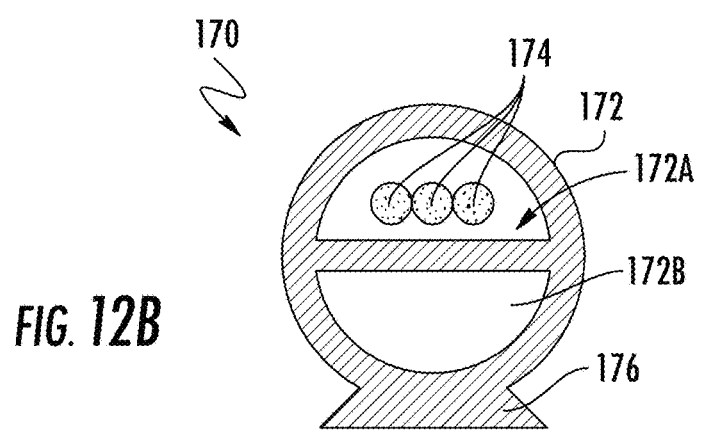

Referring to FIGS. 12A and 12B, the outer substrate of the dryer door a seal disclosed herein can comprise a variety of different cross-sectional shapes. As shown in FIG. 12A, a dryer door seal 160 can be provided with an outer substrate 162 that can have a plurality of compartments, or interior cavities 162A, 162B, 162C therein. In the embodiment shown, the outer substrate 162 has three compartments 162A, 162B, 162C with the compartment 162A housing and an inner substrate 164 that comprises a heat resistant coating similar to those described above. The outer substrate 162 can comprise a circular outer cross-sectional shape and may comprise a foot portion 166 for attachment by adhesive or some combination of adhesive and other mechanic means. By having the inner substrate 164 in the compartment or cavity that is adjacent the bulkhead when the door seal is installed in a door and the door of the dryer is closed, the expansion of the activated seal may be facilitated in some embodiments. Further, in such embodiments, by having the other compartments, or interior cavities unoccupied, 162B, 162C, the dryer door seal 160 may have an increase in compressibility so that a tight seal between the door and the bulkhead of the dryer may be obtained during normal operations. The extra dividing portions 168 of the outer substrate 162 can provide extra resilience for the dryer door seal 160. It is noted that in other embodiments, the inner substrate may be in one or both of the other compartments, or interior cavities, 162B, 162C.

FIG. 12B illustrates an embodiment of a dryer door seal 170 can comprise an outer substrate 172 that can have a pair of compartments, interior cavities, 172A, 172B therein. The outer substrate 172 can comprise a circular outer cross-sectional shape and can comprise a foot portion 176 for attachment by adhesive or some combination of adhesive and other mechanic means. In the embodiment shown, an inner substrate 174 that comprises a heat resistant coating similar to those described above can reside in the upward compartment 172A of the door seal 170. By having the inner substrate 174 in the compartment or cavity that is adjacent the bulkhead when the door seal is installed in a door and the door of the dryer is closed, the expansion of the activated seal may be facilitated in some embodiments. It is noted that in other embodiments, the inner substrate may be the other compartment, or interior cavity, 172B.

Figure 12C:
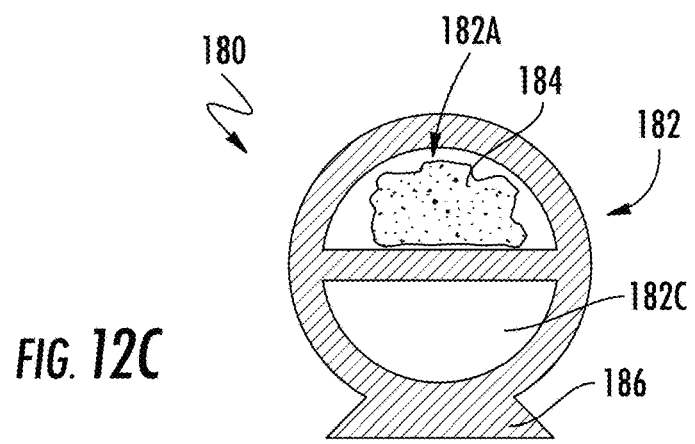

FIG. 12C illustrate another embodiment of a high temperature dyer door seal 180 for a dryer that comprises an outer substrate 182 forming one or more interior cavities, such as compartments 182A, 182B. As in other embodiments of the door seal, the outer substrate 180 it deformable upon compression and has a shape to provide a tight seal between a dryer door and a bulkhead of the dryer. In the embodiment shown, the outer substrate 182 comprises a circular outer cross-sectional shape and can comprise a foot portion 186 for attachment by adhesive or some combination of adhesive and other mechanic means. The dryer door seal 180 can further comprise a heat resistant coating 184 disposed within the upper interior cavity 182A of the outer substrate 182. The heat resistant coating 184 can be, for example, sprayed into the compartment 182A and can expand at temperatures above an activation temperature. The outer substrate 182 can comprise a polymer that has a melting point below the activation temperature at which the heat resistant coating 184 is activated. It is noted that in other embodiments, the inner substrate may be in the other compartment, or interior cavity, 172B. It is also noted that an outer substrate having a single cavity therein, such as the D-section shaped outer substrate can also be used in which the heat resistant coating is sprayed within the cavity or compartment of the D-section outer substrate.

Thus, a high temperature dryer door seal can be provided that comprises an outer substrate comprising a body forming an interior for cavity. The outer substrate can be deformable upon compression and can have a shape to provide a tight seal between a dryer door and a bulkhead of the dryer. The dryer door seal can also comprise a heat resistant material that expands at temperatures above an activation temperature dispersed within the body of the outer substrate. The outer substrate comprising a polymer that has a melting point below the activation temperature at which the heat resistant coating is activated.

Figure 13:
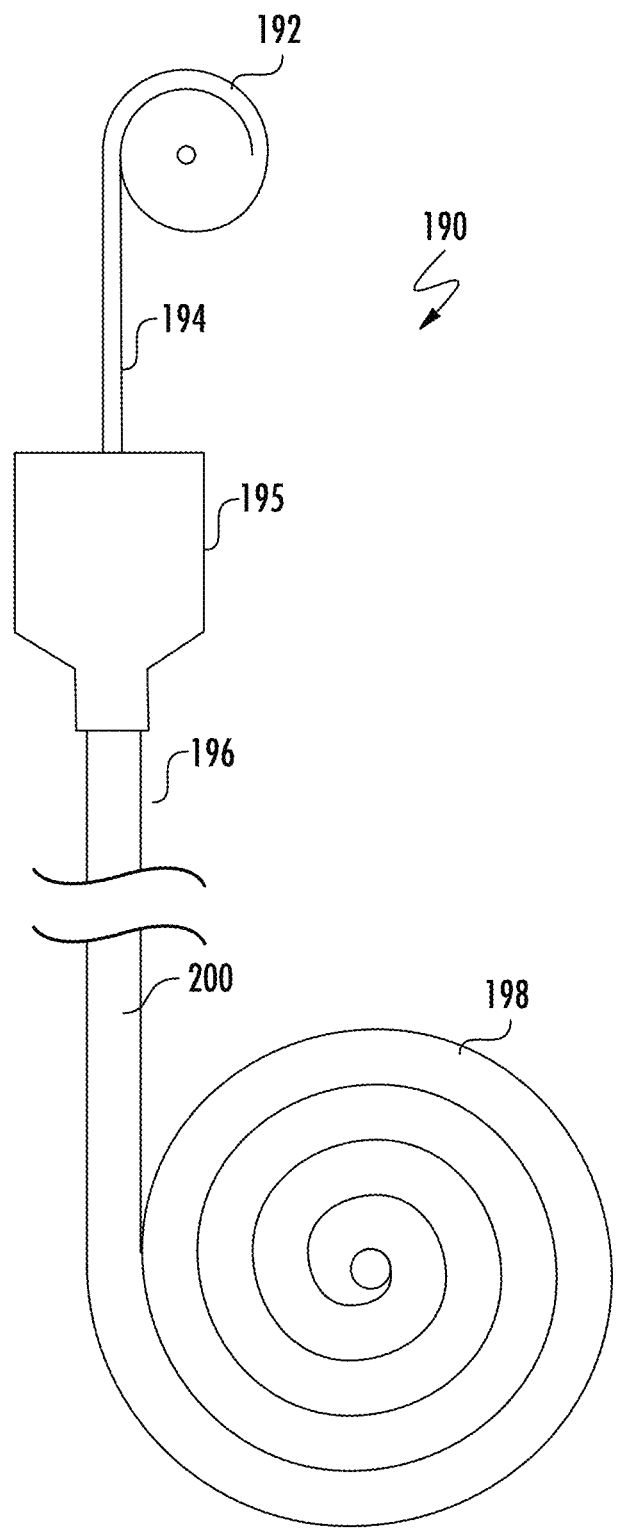
FIG. 13 illustrates a schematic view of an additional process of manufacturing an embodiment of a dryer seal according to the present subject matter.

Referring to FIG. 13, another process 190 of manufacturing a dryer door seal is provided. The method 190 of manufacturing a high temperature dryer door seal can comprise providing an inner substrate 194 with a heat resistant coating disposed on at least one surface of the inner substrate 194. The heat resistant coating can expand at temperatures above an activation temperature for the heat resistant coating. As shown in FIG. 13, the inner substrate 194 can be provided in bulk, for example, on a roll 192. The inner substrate 194 can then be inserted into an interior cavity of a body of the outer substrate 196. The outer substrate 196 can comprise a polymer that has a melting point below the activation temperature at which the heat resistant coating is activated. For example as shown in FIG. 13, the outer substrate 196 can be formed around the inner substrate 194 by an extrusion system 195. For example, the polymer that forms the outer substrate can be extruded around the inner substrate within the cross section shape of the outer substrate 196 such that the inner substrate resides within an interior cavity of the outer substrate 196 being formed by the extrusion system. Thereby the structure of the body 200 for a door seal can be massed produced and stored in bulk, for example on a roll 198. The body 200 can then be cut to size and installed on a dryer door to form a door seal.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole and in part. Furthermore, those of ordinary skill in the art will appreciate that the foregoing description is by way of example only, and is not intended to limit the present subject matter.

What is claimed is:

1. A high temperature dryer door seal comprising:
   an outer substrate forming an interior cavity, the outer substrate being deformable upon compression and having a shape to provide a tight seal between a dryer door and a bulkhead of a dryer; and
   a heat resistant coating disposed within the interior cavity of the outer substrate that expands at temperatures above an activation temperature, the outer substrate comprising a polymer that has a melting point below the activation temperature at which the heat resistant coating is activated.

2. A method of manufacturing a high temperature dryer door seal, the method comprising:
   providing an inner substrate with a heat resistant coating disposed on at least one surface of the inner substrate that expands at temperatures above an activation temperature; and
   inserting the inner substrate into an interior cavity of a body of an outer substrate, the outer substrate comprising a polymer that has a melting point below the activation temperature at which the heat resistant coating is activated.

3. The method according claim 2, wherein the step of inserting the inner substrate comprises inserting the inner substrate into the outer substrate that has already been formed.

4. The method according to claim 2, wherein the step of inserting the inner substrate comprises forming the outer substrate around the inner substrate.

5. A high temperature dryer door seal comprising:
   an outer substrate forming an interior cavity, the outer substrate being deformable upon compression and having a shape to provide a tight seal between a dryer door and a front bulkhead of a dryer;
   an inner substrate residing within the interior cavity of the outer substrate and permitting the outer substrate to deform upon compression between the dryer door and the front bulkhead of the dryer; and
   a heat resistant coating disposed on at least one surface of the inner substrate that expands at temperatures above an activation temperature, the outer substrate comprising a polymer that has a melting point below the activation temperature at which the heat resistant coating is activated.

6. The dryer door seal according to claim 1, wherein the outer substrate comprises an extruded polymer.

7. The dryer door seal according to claim 1, wherein the outer substrate comprises a low-melt polymer.

8. The dryer door seal according to claim 1, wherein the outer substrate comprises a polymer with a melting point below 400° F.

9. The dryer door seal according to claim 1, wherein the outer substrate comprises a polymer with a melting point of about 320° F. or below.

10. The dryer door seal according to claim 1, wherein the outer substrate comprises an extruded polyvinyl chloride (PVC) with the interior cavity being formed during extrusion.

11. The dryer door seal according to claim 1, wherein the inner substrate comprises a polymer with a melting point above the melting point of the outer substrate.

12. The dryer door seal according to claim 1, wherein the inner substrate comprises at least one of extruded ribbon yarns, glass reinforced plastic (GRP) continuous filament fibers, PET and polypropylene point bonds, ropes, braids, corespun yarns, woven fabric, knitted fabric, or nonwoven fabric.

13. The dryer door seal according to claim 1, wherein the outer substrate is extruded around the inner substrate.

14. The dryer door seal according to claim 1, wherein the amount of heat resistant coating on the inner substrate generally corresponds to an expected deformation of the door when exposed to extreme heat or flame.

15. The dryer door seal according to claim 1, wherein upon activation by exposure to heat, the heat resistant coating creates reduced air permeability and restricts fuel source flow around the door of the dryer.

16. The dryer door seal according to claim 1, wherein the amount of heat resistant coating is configured to compensate for the distortion of the door of the dryer and melted outer substrate upon exposure to a combustion event.

17. The dryer door seal according to claim 1, wherein the content and geometry of heat resistant coating is configured to cover tolerance variations in the door and the front bulkhead and ensure an oxygen throttle for combustion containment.

18. The dryer door seal according to claim 1, wherein the inner substrate retains its structure upon exposure to extreme heat or flame to hold the heat resistant coating in place and prevent it from being dissipated upon the melting and dispersion of the outer substrate.

19. The dryer seal according to claim 1, wherein the inner substrate comprises a first surface and a second surface and the heat resistant coating is disposed on both the first and second surfaces of the inner substrate.

20. The dryer seal according to claim 1, wherein upon exposure to extreme heat or flame to hold the heat resistant coating in place, the outer substrate melts and adheres to the inner substrate which retains its structure.

* * * * *